United States Patent [19]

Dorren

[11] Patent Number: 5,038,221
[45] Date of Patent: Aug. 6, 1991

[54] LUMINANCE ENCODED DIGITAL AUDIO SYSTEM

[76] Inventor: Louis Dorren, 811 Taylor Blvd., Millbrae, Calif. 94043

[21] Appl. No.: 107,338

[22] Filed: Oct. 13, 1987

[51] Int. Cl.$^5$ .............................................. H04N 5/76
[52] U.S. Cl. .................................................. 358/343
[58] Field of Search ............... 358/341, 342, 339, 343; 360/36.2, 19.1, 10.1, 8, 32

[56] References Cited

U.S. PATENT DOCUMENTS

| | | | |
|---|---|---|---|
| 3,872,503 | 3/1975 | Shutterly | 360/36.2 |
| 4,030,129 | 6/1977 | Whitlock | 360/32 |
| 4,138,694 | 2/1979 | Doi et al. | 358/339 |
| 4,215,376 | 7/1980 | Mach | 360/36.2 |
| 4,473,850 | 9/1984 | Foerster et al. | 360/19.1 X |
| 4,590,522 | 5/1986 | Takemoto et al. | 358/321 |
| 4,751,590 | 6/1988 | Wilkinson | 360/19.1 |
| 4,823,197 | 4/1989 | Sakata et al. | 358/343 X |

*Primary Examiner*—L. T. Hix
*Assistant Examiner*—D. Rutledge
*Attorney, Agent, or Firm*—Ernest M. Anderson

[57] ABSTRACT

A luminance signal encoder and decoder is disclosed for digitizing multiple high quality signal channels and converting them to a television frame while maintaining the Nyquist Sampling Rate, increasing the density of the digital information which then can be recorded. Recorded signals may then be played back, transmitted to and received by any device that utilizes the television frame.

5 Claims, 3 Drawing Sheets

LUMINANCE ENCODED DIGITAL AUDIO SYSTEM

SUMMARY OF THE INVENTION

The present invention relates primarily to high quality multichannel digital audio recording and reproducing systems. However, the invention is one of broad scope and is applicable to any electronic archival or communications system. The invention maintains the Nyquist Sampling Rate while packing higher densities of digital information into a television frame. The number of bits for encoding, the sampling rate and the quantized signal bandwidth may be customized to a particular system. The invention avoids data compression so that all data bits are passed through the system intact and no algorithmic compression or decompression techniques are required during encoding or decoding.

In a preferred embodiment, the encoder of the present invention utilizes a data packet generator and a luminance converter. The data packet generator takes incoming serial data streams from analog to digital converters and error correction data generators and builds the data streams into data packets that are synchronized with an outgoing television line. The data packets are fed to the luminance converter where the data is converted to luminance picture levels of black, shades of grey and white. This creates high density data television lines which can now be joined to television sync and interlace, creating a standard television frame.

The decoder of the present invention also utilizes a luminance converter and a data packet separator. The luminance converter in this case functions in reverse by converting the luminance picture levels back into data packets. The data packets are then fed to the data packet separator which in turn restores the original serial data streams. These data streams are then fed to an error correction data generator and a digital to analog converter for reproduction.

DESCRIPTION OF THE PREFERRED EMBODIMENT

Figure 1:
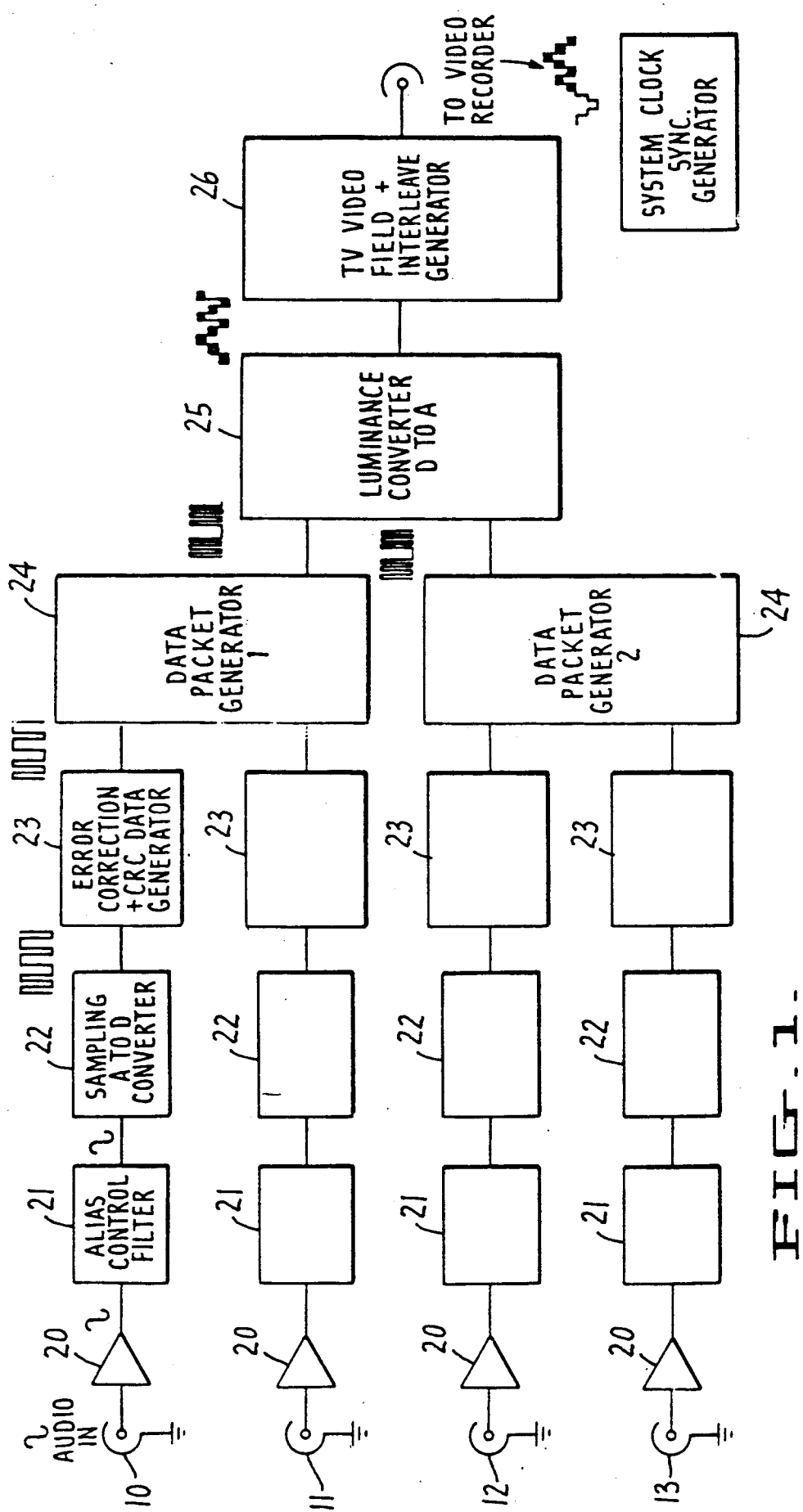
FIG. 1 is a block diagram of a preferred embodiment of the invention in a luminance encoder system.

Reference is made to FIGS. 1 through 4 which illustrate a preferred embodiment of the invention. A plurality of audio signals are introduced at inputs 10, 11, 12 and 13. Each input connects to a buffer amplifier 20, and each audio signal is then fed through an alias control filter 21 to a sampling A to D converter 22. Each converter 22 yields a digital representation of the input signal which is then put through an error correction and CRC data generator 23 which generates cyclic redundancy information and error correction codes. Various types of error correction codes may be utilized, including Hamming code, Reed-Solomon coding, cyclic redundancy and/or parity checking. A pair of data packet generators 24 take the data streams from the input channels of a pair of generators 23 and builds each pair of data streams into packets consisting of data from each input stream together with packet synchronization information.

The output of data packet generators 24 are fed into a luminance D-A converter 25 which performs luminance conversion into four levels of luminance. The corresponding levels are not fixed to one format and may be determined based on the application. For this illustration a data level zero for packet generator 1 and a data level zero for packet generator 2 is luminance 0 (black); data level one for packet generator 1 and a data level zero for packet generator 2 is luminance 1 (dark gray); data level zero for packet generator 1 and a data level one for packet generator 2 is luminance 2 (light grey); and data level one for both packet generator 1 and packet generator 2 is luminance 3 (white).

The output of converter 25 is then fed into television video frame generator 26 which generates the TV sync and builds the packets into the video frames. The composite output may then be fed to an external video recorder 27 or to a video transmitter.

Figure 2:
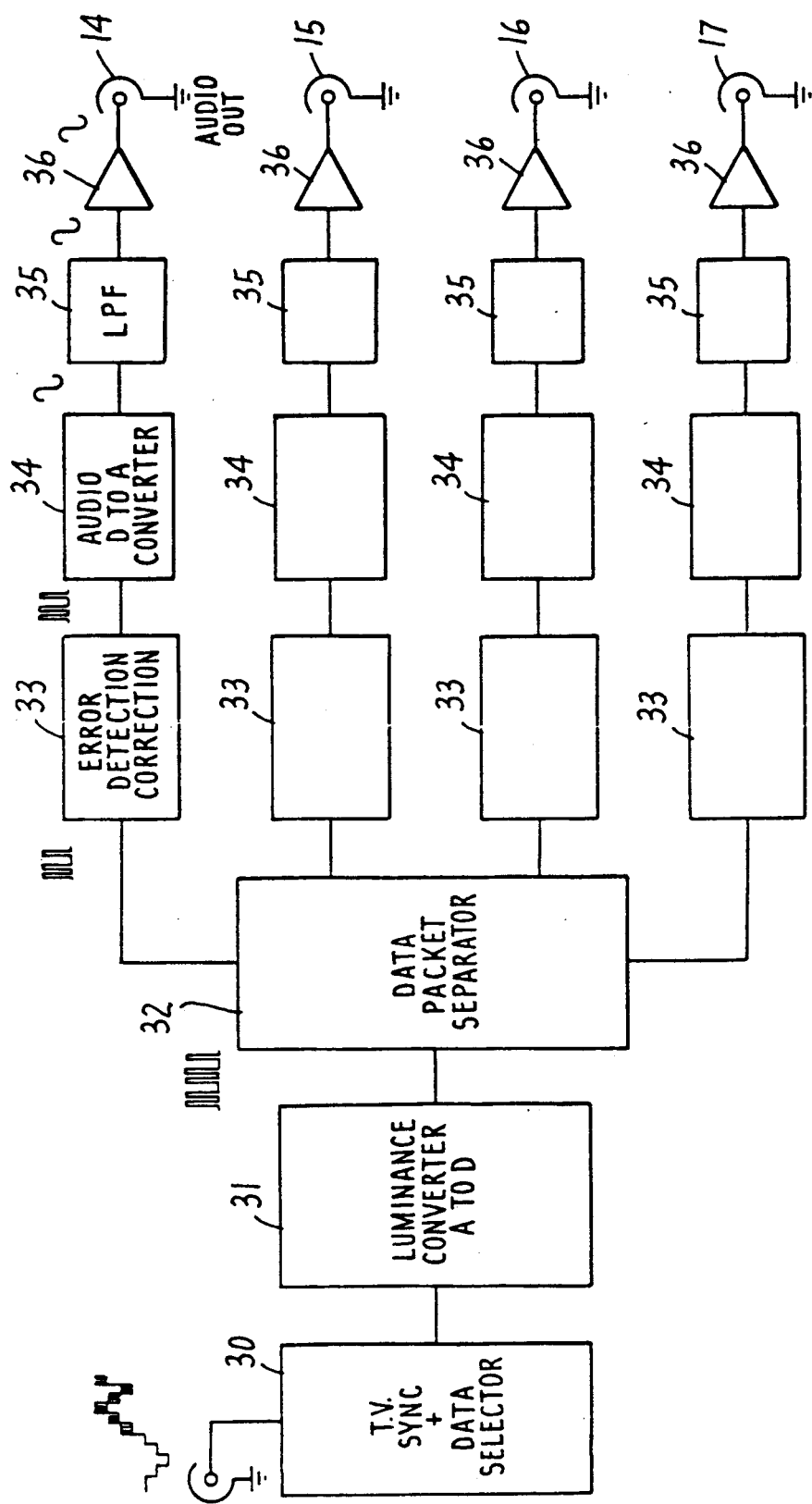
FIG. 2 is a block diagram of a decoder that embodies the present invention.

In FIG. 2, the reproduction system receives the input signal from a video player or transmitter. The composite video signal is fed into the TV sync and data selector block 30 which synchronizes the reproduction system to the incoming video and separates the luminance encoded data stream from the actual video signal. The luminance encoding data stream is then fed into luminance data decoder 31 where the encoded signal is converted back into data packets. The data packets are then fed to a data packet separator 32 which separates the actual data from the packet synchronizing signals and feeds the data into error correction circuits 33, which check the validity of the data and correct, if necessary, any errors that may have occurred. The signal is then fed to audio digital to analog (D-A) signal converters 34 which covert the digital signals back into the original analog signals. Low pass filters (LPF) 35 are employed to remove any higher order components created by the processing system and the outputs are then fed to buffer amplifiers 36 and to the outputs 14, 15, 16 and 17 of the processing unit.

Figure 3:
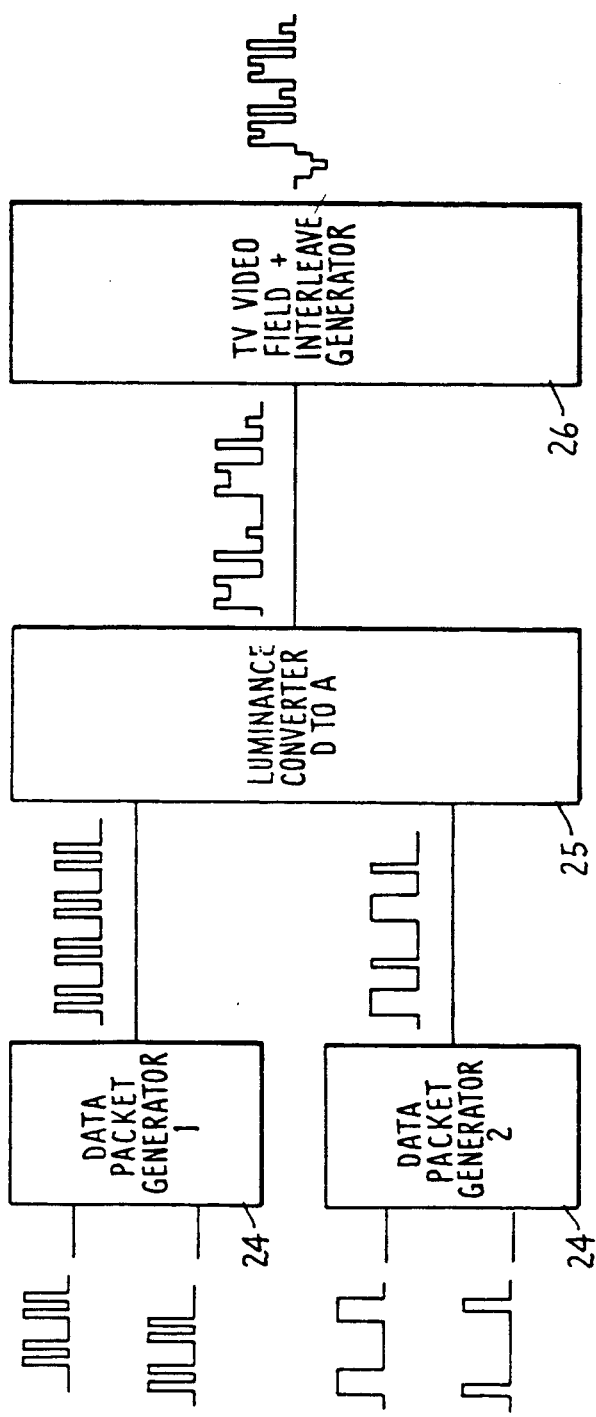
FIG. 3 is a block signal flow diagram of the encoder of FIG. 1.

FIG. 3 illustrates how four individual data streams are converted into alternate data frames in the data packet, making one data packet stream from two serial data inputs. It is obvious that this is not limited to two input streams and any number of streams may be combined dependent on the final system requirements.

Figure 4:
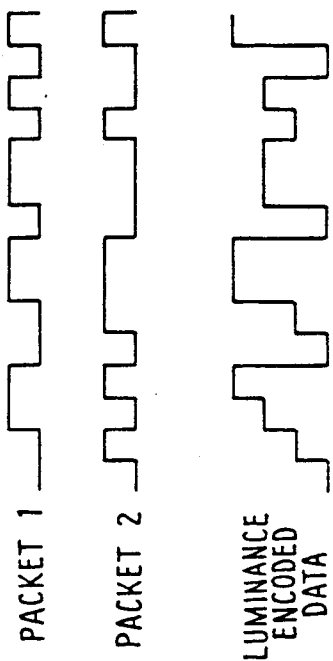
FIG. 4 is a timing diagram of the encoder.

FIG. 4 illustrates how a pair of signals coming out of data packet generators 24 produce a four level signal out of converter 25. This results from having four distinct pedestals; a zero, a one, a two and a three. In the example shown, transitions between 0 and 1 or 2 and 3 represent a "1" for data packet 1; the transitions between 0 and 2 or 1 and 2 represent a "1" for data packet 2. All remaining states represents "0" for both packets. This multiple level luminance signal maintains the Nyquist rate for the original data channels while utilizing the television video spectrum more efficiently.

The present invention is not limited to television frame encoding but was designed for high quality digital audio recording and transmission on standard video equipment. In a typical application, four independent audio signals, as from a live orchestral performance, can be digitized, encoded and recorded on a video tape deck.

Although a preferred embodiment of the invention has been illustrated and described, various modifications and changes can be resorted to without departing from the spirit of the invention or the scope of the appended claims. For instance, the preferred embodiment of the invention can be applied to mass storage data systems for computers as well as for the storage of audio signals.

What is claimed is:

1. A method of encoding and recording analog input signals comprising the steps:
converting a plurality of analog signals into digital output signals, combining the digital output signals and generating an analog luminance signal, converting the luminance signal to a television frame signal, and recording said television frame signal.

2. The method of claim 1, a first pair of input signals being combined into a first data packet, a second pair of input signals being combined into a second data packet, said first and second data packets being encoded and combined to generate said analog luminance signal.

3. A method of encoding, recording and decoding a plurality of audio signals comprising the steps:
converting a plurality of analog audio signals into digital output signals, combining the digital output signals and generating an analog luminance signal, converting the luminance signal to a television frame signal, and recording said television frame signal; thereafter reading out said television frame signal, converting the television frame signal and generating an analog luminance signal, decoding the luminance signal and generating a plurality of analog audio output signals.

4. Apparatus for recording a plurality of analog input signals comprising:
means for receiving two or more analog input signals, combining and converting said signals to produce a combined digital output signal; means for encoding the digital output signal and generating an analog luminance signal; and means for converting the luminance signal to a television frame signal for recording.

5. The apparatus of claim 4 and further comprising:
means for receiving the television frame signal and generating a luminance signal; means for decoding said luminance signal and generating a digital output signal; and means for separating said digital output signal and generating a plurality of audio output signals corresponding to the two or more analog input signals.

* * * * *